July 6, 1965

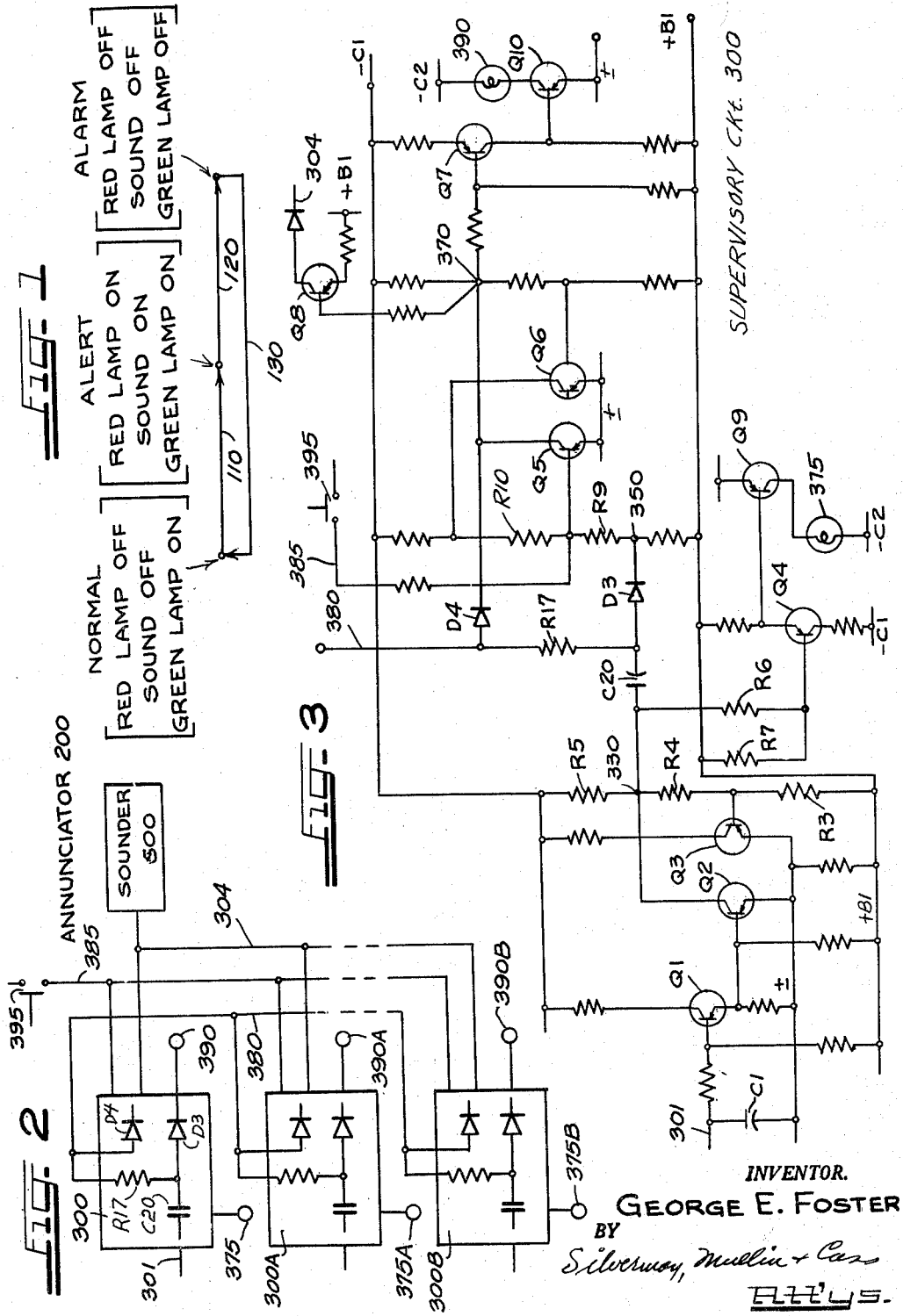

G. E. FOSTER 3,193,814

ELECTRONIC ANNUNCIATOR CONTROL

Filed Aug. 17, 1960

INVENTOR.
GEORGE E. FOSTER
BY
Silverman, Mullin & Coss
ATTY'S.

United States Patent Office 3,193,814
Patented July 6, 1965

3,193,814
ELECTRONIC ANNUNCIATOR CONTROL
George E. Foster, 7917 S. Yale Ave., Chicago, Ill.
Filed Aug. 17, 1960, Ser. No. 50,144
6 Claims. (Cl. 340—223)

This invention relates in general to annunciators and more particularly to an electronic annunciator system in which the development of a particular condition at one among many monitored locations is indicated in the relative order in which that condition is developed.

In application, Serial No. 9,925 filed Feb. 19, 1960 for an Annunciator now U.S. Patent No. 3,155,950, and a copending application, Serial No. 49,670, filed August 15, 1960 for Electronic Annunciator Improvements there are electronic annunciator arrangements disclosed in which a number of supervisory circuits monitor respective locations and are arranged to control a common sounder circuit. On receiving a signal indicating a trouble or fault condition from a respective location, each supervisory circuit signals an alert condition to an attendant by flashing a lamp individual thereto and operating the common sounder circuit. This alert condition might be signalled almost simultaneously from a number of monitored locations as each successively developed a fault signal responsive, for example, to the initial fault. The attendant acknowledge occurrence of the alert condition by operating a acknowledgement key which placed the annunciator in a certain condition known as the alarm condition and thereafter waited for the trouble condition to be cleared. In the described arrangements no means was provided for indicating the first location to develop the fault signal, and although not a handicap, the lack of such an indication left unrealized an important annunciator tool.

This tool comprises information as to which location first develops the trouble or fault condition. Thus if it is known at which location this first occurs, it is often possible to isolate the cause or problem which may have given rise to a fault signal at a number of locations and thereby considerably simplified the remedial steps to be taken.

In the present invention it is proposed to illustrate novel annunciator circuits utilizing solid state elements in arrangements that permit the annunciator to signal at which location a fault first or initially arises. Thus by indicating at which position the fault first arises, the attendant is informed of a possible source of trouble that has given rise to a train or sequence of trouble signals to the annunciator and in turn by eliminating the initial fault may restore apparatus at a number of locations to an operative condition.

The annunciator in which the present invention is illustrated comprises a number of supervisory circuits each arranged to monitor apparatus at a respective remote location and to alert the attendant in the vicinity of the annunciator in response to a fault signal arising at one location. In alerting the attendant, a signal of a predetermined type may be furnished individual to the supervisory circuit so that the attendant is informed of the fault location. In operating this signal an unusually simple circuit arrangement is provided that is controlled for thereafter blocking the operation of a corresponding type of signal individual to other supervisory circuits. As only one individual signal of the type can thus be operated the attendant knows the location of the initial fault. It will be understood that although the term fault or trouble will be used extensively throughout the description and claims that such terms are actually intended to cover any departure from normal, as the annunciator arrangements shown herein are useful in many types of call systems.

It is therefore an object of the present invention to provide an electronic annunciator which monitors apparatus at a plurality of different locations for respective abnormal or fault signals and on receiving the same indicates at which location the first fault signal arose.

It is another object of this invention to provide an electronic annunciator which indicates the sequence in which incoming signals are received.

It is another object of this invention to provide a novel annunciator having respective signal control paths and arranged so that the first signal control path to receive a signal is thereafter effective for preventing the use of any other signal control path.

It is a further object of this invention to provide an annunciator in which a plurality of signal conditions are provided for each location at which a fault may arise and in which only the first fault to arise, enables said annunciator to operate the respective plurality of signals while successive faults thereafter enable said annunciator to operate less than the respective plurality of signals.

With the foregoing and other objects in view which will appear as the description proceeds, the invention consists of certain novel circuits and features and a combination of parts hereinafter fully described, illustrated in the accompanying drawing, and particularly pointed out in the appended claims it being understood that various changes in the form and minor details of the circuits and apparatus may be made without departing from the spirit or sacrificing any of the advantages of the invention.

For the purpose of facilitating an understanding of this invention, there is illustrated in the accompanying drawing a preferred embodiment thereof, from an inspection of which, when considered in connection with the following description, this invention, its mode of construction, assembly and operation, and many of its advantages should be readily understood and appreciated.

Referring to the drawing in which the same reference characters are employed wherever feasible to indicate corresponding or similar parts throughout the several figures of the drawing:

FIG. 1 is a diagrammatic illustration of the operative sequence of one type annunciator to be described in connection with FIGS. 2 and 3.

FIG. 2 is a block diagram of the annunciator whose operative sequence is shown in FIG. 1.

FIG. 3 illustrates the circuit details of one of the supervisory circuits indicated in the block diagram in FIG. 2.

Referring now to FIG. 1 it will be seen that the operative sequence for the annunciator system shown herein has been simplified from that described in the aforementioned applications, although it should be understood that the invention herein is also capable of use with an annunciator system having an operative sequence as described in those applications.

Thus, the annunciator conditions are indicated by a normal, alert and alarm condition. In the normal condition no abnormal or fault signal is provided and at each supervisory circuit monitoring a respective location, a green lamp individual thereto is on, the red lamp individual to each supervisory circuit is off and the sound is off. A fault signal arising from a monitored location and transmitted to its respective supervisory circuit causes the green and red lamps thereat to light and also turn the sound on. This is called the alert condition and the changes in annunciator status are indicated by the line 110 in FIG. 1. The alarm condition occurs after the attendant acknowledges the alert condition by operating an appropriate key and the just mentioned red and green lamps and the sound are turned off. This change in the annunciator status is indicated by line 120 in FIG. 1.

Thereafter, if the fault is removed, the green light is turned back on indicating the return of the annunciator to normal and this change in status is shown by the line 130 in FIG. 1. It will be noted, in this operative sequence, that the flash condition described in the aforementioned applications for providing a special signal to the attendant indicating alleviation of the trouble and the acknowledgment operation required thereafter is eliminated, however in the block diagram illustrated in FIG. 5 such an operative sequence for use with the present invention is illustrated.

Reference will now be made to FIG. 2 showing the annunciator 200 in block form. It will be seen that the annunciator comprises a number of supervisory circuits indicated at 300, 300A and 300B each having a respective pair of lamps or lights 375 and 390, 375A and 390A and 375B and 390B, and each is arranged to monitor a location individual thereto over a lead such as 301. Each lamp of a pair are preferably provided with windows of different color so that the respective signals provided thereby are more easily distinguished. The number of supervisory circuits may of course vary in accordance with the number of remote locations to be monitored.

Figure 4:
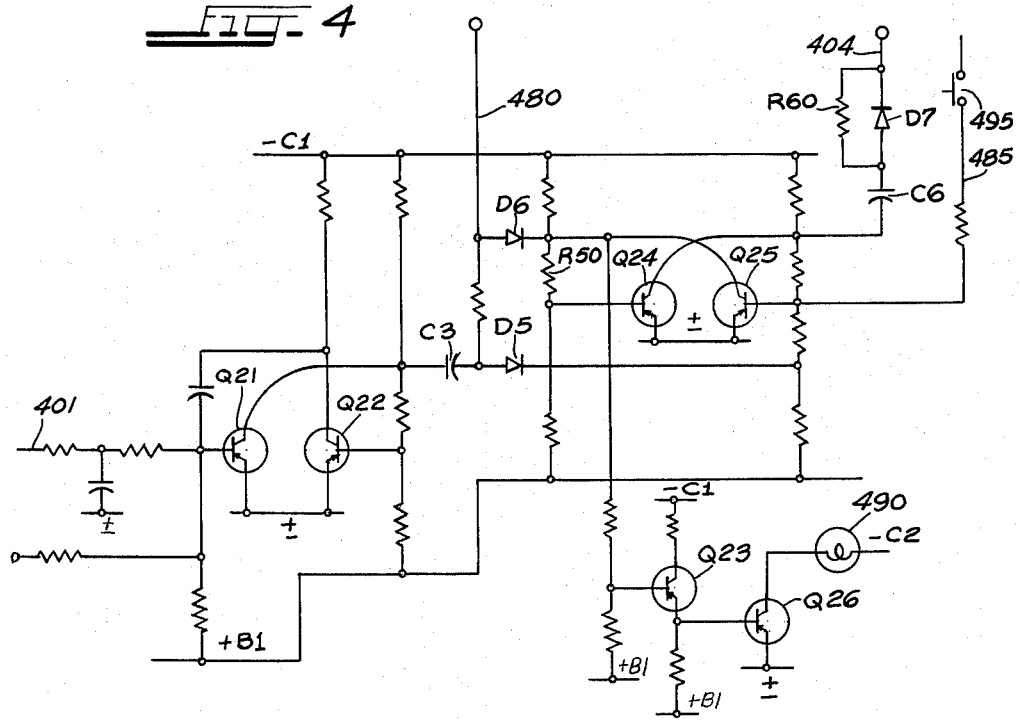
FIG. 4 is a simplified supervisory circuit arrangement for use in an annunciator having a slightly different operative sequence from the annunciator shown in FIG. 1.

In addition, the annunciator comprises a sounder circuit indicated at 500. No flasher circuit such as described in the aforementioned applications for providing intermittently operated signals is provided although within the concepts of the invention. The sounder or sounder circuit 500 may either be of the type disclosed in the first or second mentioned applications and for this reason separate versions of supervisory and common acknowledgment circuits are shown in FIGS. 3 and 4. That shown in FIG. 3 is intended for operation with a sounder such as described in the second application, while that shown in FIG. 4 is intended to operate with a sounder such as shown in the first application.

The supervisory circuits 300, 300A and 300B each respond to a trouble signal at any of the individual monitored locations by extinguishing the individual lamps 375, etc. and lighting an individual lamp 390. The lamp 375 may for example, provide a green light, while lamp 390, for example, provides a red light. Likewise lamps 375A and 375B provide light corresponding to lamp 375, while lamp 390A and 390B provide light similar to lamp 390. Each supervisory circuit is also arranged to control the sounder 500 to initiate an audible signal in response to the received fault signal and to block the lighting of a red lamp at another supervisory circuit. Thus if supervisory circuit 300 is the first in a group to receive a trouble signal, its green lamp 375 is extinguished while its red lamp 390 is lighted. Simultaneously a blocking signal is provided to lead 380, which is connected in common to the supervisory circuits. This blocking signal prevents the red lamp 390A or 390B, for example, at another supervisory circuit from lighting. The supervisory circuit also operates the sounder 500 over lead 304 and this calls the attention of the attendant to the annunciator 200 being in the alert condition.

The attendant on scanning the lights notes at which circuit the red lamp 390 is lighted and thereafter operates the acknowledgment key 395 to apply a signal to acknowledgment lead 385. This signal then causes the lighted lamp 390 to extinguish, but the attendant is now informed of the location at which the fault condition has originally developed irrespective of the fact that the green lamp at a number of supervisory circuits may have extinguished responsive to respective fault signals. He may therefore take the proper steps to alleviate this condition. The annunciator is now in the alarm condition with the lamps and sound off. As soon as the trouble is alleviated the proper signalling condition is applied to lead 301 and the green lamp 375 relights to indicate a return to normal. Of course the elimination of the primary trouble problem may similarly remove the fault signal at several auxiliary locations and the respective green lamps corresponding to those locations will relight to provide such information.

Turning now to a detailed version of the supervisory circuit 300 as shown in FIG. 3, it will be seen that the input lead 301 is connected to the base circuit of normally off transistor Q1. Transistor Q2 is also normally biased to an off condition, while transistor Q3 is normally biased on. Resistors R3, R4 and R5 are chosen to ensure that the potential at junction 330 is negative and resistors R6 and R7 are chosen to ensure that this potential maintains transistor Q4 on. The transistor amplifier Q9 connected to the emitter circuit of Q4 is therefore also on and green lamp 375 connected in the collector circuit of Q9 is normally lighted to inform the attendant that the supervisory circuit is in a normal condition.

Also connected to the junction 330 is one terminal of condenser C20 and it is charged to the value of junction 330. The other condenser terminal is connected to the diode D3 and the resistor R17. Resistor R17 in turn is connected to the common first out control lead 380 and this lead is similarly connected at all the supervisory circuits.

The diode D3 is connected to junction 350 and from there through resistor R9 to the base circuit of the normally conducting transistor Q5. Transistor Q5 has its collector circuit connected with junction 370 and to the first out common lead 380 through the diode D4. Transistor Q5 is part of a memory unit which includes normally off transistor Q6. The junction 370 is therefore normally biased to hold transistors Q7 and Q8 off so that the red lamp 390 and sounder 500 respectively controlled thereby are normally unoperated. It will be appreciated, of course, that at other supervisory circuits a connection to the lead 380 similar to that described herein is provided so that the common lead 380 is biased at a similar value by all the supervisory circuits when in their normal condition. The various potentials utilized are indicated at +B1 for positive values, −C1 and −C2 for negative values and ± for neutral values, that is values lying between the positive and negative indicated potentials and may, for example, be at ground.

Assuming now that a trouble signal occurs at a location being monitored by the supervisory circuit 300 and that therefore a negative signal is transmitted to lead 301 in any well known manner and applied to the base circuit of transistor Q1 as soon as condenser C1 is charged. Transistor Q1 then turns on and its emitter circuit becomes more negative. That potential is applied to the base circuit of transistor Q2 which now initiates conduction. Junction 330 therefore swings toward neutral potential to extinguish transistors Q3 and Q4. As transistor Q4 goes off its emitter circuit becomes positive and transistor Q9 is therefore tuned off to extinguish the green lamp 375 indicating that the supervisory circuit is no longer in its normal condition.

With junction 330 swinging towards neutral potential, the plate of condenser C20 connected thereto charges in the same direction to transmit a positive pulse through diode D3 and through resistor R9 to extinguish transistor Q5. This causes junction 370 to swing negative. As junction 370 swings negative, transistors Q6, Q7 and Q8 each initiate conduction.

With transistor Q7 conducting, its collector circuit swings negative to initiate conduction in transistor Q10 and the red lamp 390 now lights to indicate the condition of the respective supervisory circuit 300.

The collector circuit for transistor Q6 on swinging positive applies a similar potential through resistors R10 so that transistor Q5 stays off.

The collector circuit of transistor Q8 on swinging positive of course transmits a pulse for operating the sounder 500 in one of the manners corresponding to that described in the second mentioned application to call the attention of the attendant to the alert condition.

Junction 370 on swinging negative also applies this negative potential through the diode D4 to the common first out lead 380 thereby lowering the bias level of the lead 380 through resistors R17 at each of the condensers such as C20 connected thereto at the respective supervisory circuits. A positive pulse derived from one of these condensers as a result of a trouble signal transmitted to the respective supervisory circuit will tend to send lead 380 in a positive direction as before, but as the negative level from which this starts is considerably lower than before, the junction 350 at the corresponding supervisory circuit cannot swing positive enough to turn off the transistor corresponding to Q5 at that circuit. Therefore any succeeding supervisory circuit which receives a trouble signal will be prevented from lighting the red lamp thereat.

With the red lamp on and the green light extinguished and his attention called to the status of the annunciator by the tone under control of the sounder 500, the attendant scans the various lights to note at which circuit the trouble condition first arose. It will be noted, in the event another supervisory circuit were signalled by an alarm condition, the condenser C20 thereat would swing in accordance with the change of potential at the junction corresponding to the designating numerals 330. However, with the common lead 380 maintained at a more negative potential than before, this swing cannot switch the transistors corresponding to Q5 and Q6 thereat. This maintains the red light off at the second or subsequent supervisory circuits having trouble although the green lamp thereat turns off. The attendant knows at which location the trouble originated because the red lamp 390 is on.

The attendant now acknowledges the situation by operating the acknowledgement key to apply a negative potential over lead 385 to the base circuit of transistor Q5 and switch that transistor on. This signal is also applied at transistors corresponding to Q5 at other supervisory circuits; however, those transistors are already conducting. Thus with transistor Q5 at supervisory circuit 300 coming on, junction 370 swings from a negative value towards neutral potential to cut off transistors Q6, Q7 and Q8. Transistor Q8, of course, cuts off the sounder, while Q7 cuts off transistor Q10 and lamp 390. Lamp 375 remains off indicating the alarm condition. Transistor Q5 on coming on also removes the negative bias on diode D4 and therefore the negative bias on conductor 380 can leak off and conductor 380 reverts to its normal condition. If desired, a high value resistance may be placed across D4 to aid in reestablishing this condition. This enables any other supervisory circuit which thereafter develops an appropriate charge on the condenser corresponding to C20 thereat to transmit a pulse through the diode corresponding to D3 and switch transistors corresponding to Q5 and Q6 at that supervisory circuit. This will, therefore, provide another alert condition for the annunciator and again bias the common lead 380 to prevent signals from being transmitted from condensers such as C20 over the diodes such as D3.

Assuming that the trouble is cleared to permit transistor Q1 to turn off, this in turn causes transistor Q2 to turn off; junction 330 swings negative turning transistor Q3 on and capacitor C20 charges accordingly. Transistor Q4 therefore initiates conduction and the green lamp 375 now turns on. The attendant is therefore informed that the annunciator is in the normal condition.

In FIG. 4, a supervisory circuit having substantially identical functions to that shown in FIG. 3 is illustrated with the certain exceptions. Those exceptions comprise primarily the elimination of the green lamp and the utilization of a sounder such as described in the first mentioned application. Therefore, only the red lamp 490 is provided and this is operated in response to the alert condition.

Thus a trouble or fault at a monitored location gives rise to a negative signal on the input lead 401 to turn transistor Q21 on. As transistor Q21 initiates conduction its collector circuit swings positive to transmit a positive pulse to the base circuit of transistor Q22 which terminates conduction through the transistor. Simultaneously, the positive pulse is transmitted through capacitor C3 and diode D5 to the base circuit of normally on transistor Q25. Transistor Q25 accordingly turns off.

As the collector circuit of transistor Q25 therefore swings negative, the resulting pulse is transmitted to the base circuit of transistor Q23 which initiates conduction. As the emitter circuit of transistor Q23 then goes negative, that potential is transmitted to the base circuit of amplifier transistor Q26, which lights the red lamp 490.

The negative swing in the collector circuit of transistor Q25 is also transmitted through the diode D6 to bias the common lead 480 negative. The negative swing in the collector of Q25 is also transmitted through resistor R50 to the base circuit of transistor Q24 and that transistor switches on.

As transistor Q24 switches on a positive pulse is transmitted through the capacitor C6 and the diode D7 to operate the sounder over lead 404 as described in the aforementioned first application. A very high value resistance R60 in the neighborhood of 4.7 megohms is provided in shunt with the diode D7 to permit the charge on the capacitor C6 to easily revert to normal, after the acknowledgement operation, so that the lead 404 is thereafter effective in a desired period for operating the sounder.

The negative bias applied to the common acknowledgement lead 480 reduces the level from which a positive pulse through a capacitor such as C3 starts at other supervisory circuits. This prevents a transistor such as Q25 at any other supervisory circuit from switching off and therefore only the red lamp 490 at the first supervisory circuit to light the same comes on.

On operation of the acknowledgement key at 495, a negative potential is transmitted over lead 485 for a predetermined time period to the base circuit of transistor Q25 and that transistor switches on. Its collector circuit therefore transmits a positive pulse to the base circuit of transistor Q23 which then cuts off to extinguish the lamp 490. The positive swing in the collector circuit of transistor Q25 is also transmitted to the base circuit of transistor Q24 and that transistor is also turned off. The common lead 480 now returns to its original condition as the bias thereon leaks off as already mentioned to permit another supervisory circuit to light its red lamp. The trouble that initiated the response may still be existent and therefore only when that is cleared are transistors Q21 and Q22 reset to normal.

Figure 5:
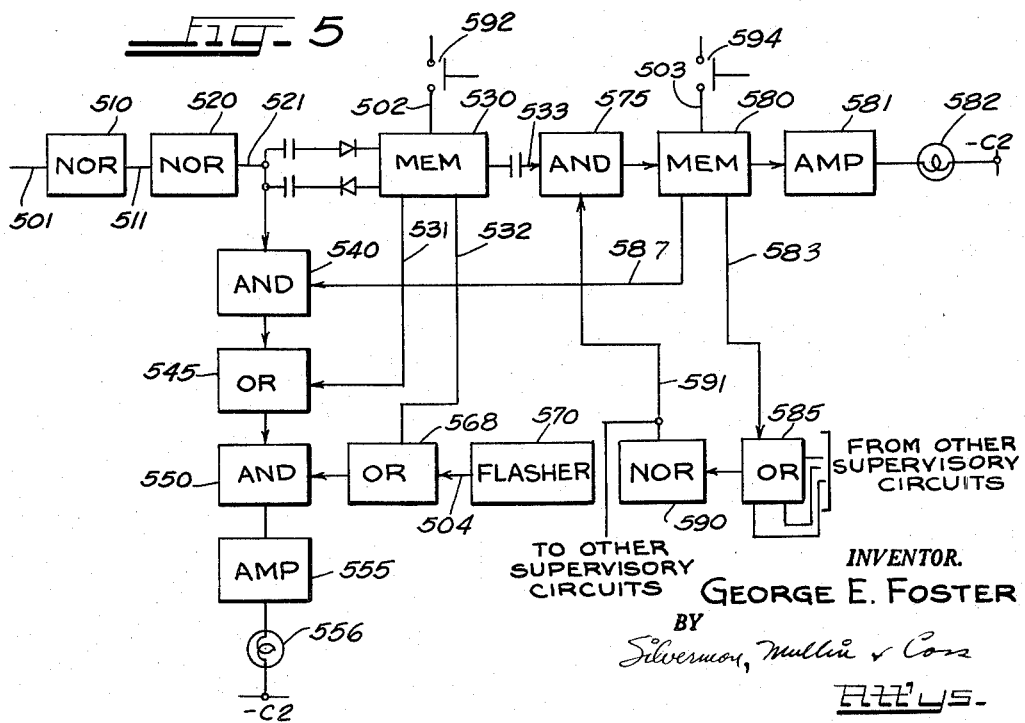
FIG. 5 is a block diagram of a supervisory circuit for use in an annuciator having an operative sequence such as described in the aforementioned patents, but incorporating the principles of the present invention.

In FIG. 5, a block diagram of a supervisory circuit of a type similar to one of those described in the aforementioned applications, but utilizing the principles of the present invention, is illustrated. The various blocks shown in FIG. 5 represent the logical equivalents for certain circuit arrangements used in such supervisory circuits including gate circuits and/or other circuit components such as amplifiers, and memories arranged to provide various operational sequences.

Thus, normally, the NOR gates indicated at 510 and 520 respectively are arranged to provide one type of signal output responsive to a normal condition on the corresponding input lead 501 under control of the respective monitored apparatus at a remote location. It will be understood, however, that the output from these gates is arranged to provide a desired signal output dependent on a change from the normal condition on lead 501.

Assume, for example, that NOR gate 510 is providing an output over conductor 511 to NOR gate 520 responsive to the normal condition on lead 501. The signal provided by gate 520 over lead 521 therefore does not enable operation of either the memory 530 or the AND gate 540. Since the AND gate 540 is closed and the memory 530 is not providing an appropriate output to OR gate 545, the AND gate 550 cannot be opened and the white light indicated at 556 is off. Likewise as the memory 580 is not providing an appropriate output to amplifier 581, the red lamp indicated at 582 is also off. The color of the lamps is of course open to numerous choices and are here described as white and red purely for the purpose of example.

Proceeding now with the description, let us assume that a fault occurs at a location which is being monitored by a supervisory circuit and a corresponding input is applied to lead 501. The NOR gate 510 then switches its output as does the NOR gate 520. As the NOR gate 520 switches its output the memory 530 receives an impulse as described in the aforementioned applications and it switches the output on leads 531, 532 and 533 accordingly extending to OR gate 545, OR gate 568 and AND gate 575 respectively.

As the output on lead 531 switches, a signal is transmitted through the OR gate 545 to the AND gate 550. The AND gate 550 must also receive a corresponding input from OR gate 568 before it can open. However, as the memory 530 has switched the output over lead 532 this cannot be provided except when the flasher indicated by the box marked 570 provides an appropriate signal over lead 504.

The flasher is as described in the first mentioned application and comprises means for transmitting alternate signals of differing potential over the lead 504 to the OR gate 568 so that intermittent signals for opening the AND gate 550 are provided from this source.

With the AND gate 550 now intermittently opened in response to the signals appearing on lead 504, the amplifier 555 is controlled for intermittently lighting the white light 556.

Simultaneously, the pulse transmitted over lead 533 to the AND gate 575 opens that gate to control the memory 580 accordingly. It will be noted the gate 575 is also controlled from a NOR gate 590 and ordinarily an appropriate signal is provided to each gate corresponding to 575 at each supervisory circuit from the NOR gate 590.

When memory 580 is controlled in response to the pulse from the gate 575, it provides an appropriate output to the amplifier 587 for lighting the red lamp 583, and simultaneously switches the output on leads 531 and 528 to the AND gate 540 and the OR gate 585.

The OR circuit 585 is controlled from the respective memories such as 580 at each of the supervisory circuits and in response to the pulse from one of the memories such as 580, the OR gate 585 transmits a pulse to the NOR gate 590. The NOR gate 590 now changes its output to each of the AND gates such as 575 at respective supervisory circuits to close those gates to further pulses along leads corresponding to 533. Thus subsequently received fault signals at other supervisory circuits will be prevented from operating the red lamp thereat. The output of memory 580 or of 530 of course can be used to operate a sounder to provide an audible indication that the annunciator is now in the alert condition in an explained manner.

In the alert condition the lamps 556 and 582 are both lighted, but lamp 556 is only lighted intermittently. It will be appreciated that when the output on lead 587 switches in response to the change in memory 580 that AND gate 540 is closed despite the proper signal on lead 521; however, memory 530 is furnishing an appropriate output over lead 531 to gate 545 and this enables gate 550 to open for lighting lamp 556.

The attendant is now alerted to the condition of the annunciator and observes which red light is on to determine at which location the trouble originated, operates an acknowledged key 592 to transmit a pulse over lead 502 for resetting the memory 530. As this occurs, leads 531, and 532 return to their respective normal conditions. As lead 531 returns to its normal condition, the OR gate 545 no longer furnishes an output to the AND gate 550 and that gate is closed despite pulses received over lead 504. As AND gate 550 is closed, the lamp 556 is extinguished and only the red light 582 remains lighted. In the meantime any other supervisory circuit at which a fault or trouble signal was subsequently received, although unable to operate a lamp such as 582 is flashing or intermittently lighting the white lamp such as 556 thereat. Thus as the memory 580 at such supervisory circuit cannot switch its lead 587, the AND gate 540 thereat is open to extend a signal through gate 545 to gate 550 which opens intermittently from pulses on lead 504, even if the acknowledgement pulse is applied to all supervisory circuits in common.

Thereafter the attendant operates the first out acknowledgement key indicated at 594 to apply a potential of suitable value over lead 503 for resetting the memory 580 to its original condition. When this occurs leads 587 and 583 revert to their original output condition. Lead 583 therefore reverts to its original condition to terminate the signal applied to the gates 585 and 590. Gate 590 therefore places an appropriate output on lead 591 so that each of the memories 575 etc. is again permitted to pass a pulse for operating the respective red lamp 582; and informing the attendant at which location or apparatus trouble first originated.

Also the output on lead 587 now reverts to normal so that the AND gate 540 is open as long as NOR gate 520 receives a signal from lead 501 indicating the trouble is still existent. Thus the OR gate 545 passes an appropriate signal to the AND gate 550 and as the OR gate 568 is also transmitting a continuous signal thereto from the lead 532, the gate 550 is continuously open to light the white lamp 556 continuously. The annunciator is now in the alarm condition with only the white lamp 556 continuously lighted. It will be appreciated from the above description that the sequence of the acknowledgement operations wherein signals are applied to leads 502 and 503 may be made immaterial as the end result is the same, as long as lead 521 remains under the influence of a trouble signal.

Thereafter restoration of the trouble signal on lead 501 restores the NOR gates 510 and 520 so that the AND gate 540 is closed. When this occurs the memory 530 also responds by transmitting a pulse which may be used to operate an audible signal as explained in the aforementioned applications and any signal on lead 533 is transmitted as before. As the memory 530 switches the output on leads 531 and 532 the white lamp 556 is again intermittently flashed. The attendant now again operates the acknowledgement keys to reset the memories 530 and 580 to restore the original outputs therefrom. As the gate 540 is now closed due to the output on lead 521 having reverted to its original condititon the lamp 556 now remains extinguished.

From the preceding description of the invention it will be appreciated that the same represents a considerable improvement in facilitating the utilization of electronic annunciators; however, it is believed that the invention should not be limited to the particular embodiment or arrangements shown herein, but that its basic concepts are more fully set forth in the appended claims.

I claim:

1. In an annunciator system of the type wherein a plurality of remote locations are monitored by respective supervisory electronic circuits, the improvement comprising a pair of indicators individual to each circuit having means for generating a corresponding pair of distinctive indicator activating signals, a memory individual to each circuit, an AND gate at each supervisory circuit for controlling the respective memory, means operated by any one of said supervisory electronic circuits responsive to a respective fault signal transmitted from the respective location for transmitting a signal to the AND gate thereat placing the respective memory in one state, means for operating one of the respective pair of signals responsive to the receipt of said fault signal, means for operating the other of said pair of signals responsive to said memory being placed in said one state, and means controlled by said memory in said one state for closing the AND gate for each respective memory to prevent any other memory from being placed in said one state responsive to a fault signal transmitted to a respective AND gate.

2. The arrangement claimed in claim 1 in which said one signal of said pair is operated intermittently responsive to said fault signal.

3. In the arrangement claimed in claim 1, means optionally operated for operating said signal continuously and for terminating operation of the other signal.

4. In an annunciator system in which there are a plurality of remote points and each point has means for producing a fault signal and transmitting same to a central location, in which there is a supervisory circuit for each point at the central location, and there is a visual fault indicator associated with and operated by each supervisory circuit respectively, the invention which comprises: each supervisory circuit including a two-state semi-conductor device having an output connected to drive the respective visual fault indicator and being effective to energize said fault indicator when in its first state, but ineffectual when in its second state, a biasing circuit connected with said semi-conductor device and holding same normally in its second state, switching means connected with the biasing circuit and adapted to be switched by a fault signal applied thereto to change the biasing circuit to place said semi-conductor device in its first state, whereby the visual fault indicator is adapted to operate upon the production of a fault signal at the point supervised by the respective supervisory circuit, each of the biasing circuits of all the supervisory circuits having a bias potential retaining network and all networks being connected together so that a potential applied to and retained by any one will likewise be applied to every other one, each of the two-state semi-conductor devices having a connection with its respective bias potential retaining network and applying a bias by way of said connection when in its first state effective to prevent any other of the two-state semi-conductor devices from being placed in its first state from its second state, whereby the first of all of the two-state semi-conductor devices to be placed in its first state by a fault signal will prevent all of the remainder of the two-state semi-conductor devices to remain in their second states, and only the visual fault indicator of said first two-state semi-conductor device will operate.

5. A structure as claimed in claim 4 in which each of the supervisory circuits includes a second visual indicator normally operative to describe the absence of a fault signal, an amplifier having biasing means rendering the same normally conductive and connected to drive the second visual indicator, means connecting the amplifier biasing means with said switching means and arranged to cut off the amplifier when a fault signal is applied to the associated supervisory circuit to extinguish the operation of the second visual indicator, said connecting means between said amplifier biasing means and switching means being unaffected by operation of said bias potential retaining network.

6. A structure as claimed in claim 4 in which means are provided to manually render said bias potential retaining network ineffective to prevent other fault signals from placing other two-state semi-conductor devices in other supervisory circuits in their second states.

References Cited by the Examiner

UNITED STATES PATENTS

| Re. 24,031 | 6/55 | Marmorstone | 340—213 XR |
| 2,493,548 | 1/50 | Proctor | 340—213 |
| 2,832,948 | 4/58 | Derr et al. | 340—213 |
| 2,858,528 | 10/58 | Diener | 340—213 |

OTHER REFERENCES

Brown et al.: Transistors: A New Class of Relays, In Control Engineering, December 1956, pp. 70–76.

NEIL C. READ, *Primary Examiner*.

BENNETT G. MILLER, *Examiner*.